(12) United States Patent
Balduf et al.

(10) Patent No.: US 11,677,741 B2
(45) Date of Patent: Jun. 13, 2023

(54) METHOD AND SYSTEM FOR SECURE TIME SYNCHRONIZATION

(71) Applicant: Siemens Aktiengesellschaft, Munich (DE)

(72) Inventors: Jochen Balduf, Hambrücken (DE); Anna Palmin, Karlsruhe (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 17/774,988

(22) PCT Filed: Nov. 10, 2020

(86) PCT No.: PCT/EP2020/081645
§ 371 (c)(1),
(2) Date: May 6, 2022

(87) PCT Pub. No.: WO2021/094311
PCT Pub. Date: May 20, 2021

(65) Prior Publication Data
US 2022/0417237 A1    Dec. 29, 2022

(30) Foreign Application Priority Data

Nov. 11, 2019   (EP) .................... 19208307

(51) Int. Cl.
*H04L 29/06*   (2006.01)
*H04L 9/40*   (2022.01)
(Continued)

(52) U.S. Cl.
CPC ...... *H04L 63/0823* (2013.01); *G05B 19/4185* (2013.01); *G06F 1/12* (2013.01);
(Continued)

(58) Field of Classification Search
CPC . H04L 63/0823; H04L 63/0442; H04L 69/28; H04L 2463/121; G05B 19/4185; G05B 2219/31213; G06F 1/12; G06F 1/14
See application file for complete search history.

(56) References Cited

U.S. PATENT DOCUMENTS

| | | | | |
|---|---|---|---|---|
| 5,392,421 A | * | 2/1995 | Lennartsson | G04G 7/00 713/400 |
| 7,447,931 B1 | * | 11/2008 | Rischar | H04J 3/0697 713/400 |

(Continued)

FOREIGN PATENT DOCUMENTS

| | | |
|---|---|---|
| CN | 102739626 | 10/2012 |
| CN | 106603182 | 4/2017 |

(Continued)

OTHER PUBLICATIONS

Karen O'Donoghue et al., New Security Mechanisms for Network Time Synchronization Protocols, Oct. 5, 2017, IEEE, pp. 1-6. (Year: 2017).*

(Continued)

*Primary Examiner* — Luu T Pham
*Assistant Examiner* — Fahimeh Mohammadi
(74) *Attorney, Agent, or Firm* — Cozen O'Connor

(57) ABSTRACT

System and method for secure time synchronization in an industrial facility, wherein a synchronization request of a facility component is transmitted to a registration service of a certificate management of the facility and the synchronization request is examined by the registration service, where the synchronization request includes a signature of the requesting facility component, and where depending on an outcome of the examination, a synchronization response is then transmitted to the requesting facility component a system time of the facility component is matched to a system (Continued)

time of the registration service based on the synchronization response.

13 Claims, 3 Drawing Sheets

(51) Int. Cl.
| | | |
|---|---|---|
| G05B 19/418 | (2006.01) | |
| G06F 1/12 | (2006.01) | |
| G06F 1/14 | (2006.01) | |
| H04L 69/28 | (2022.01) | |

(52) U.S. Cl.
CPC ............ *G06F 1/14* (2013.01); *H04L 63/0442* (2013.01); *H04L 69/28* (2013.01); *G05B 2219/31213* (2013.01); *H04L 2463/121* (2013.01)

(56) References Cited

U.S. PATENT DOCUMENTS

| | | | | |
|---|---|---|---|---|
| 10,656,894 | B2* | 5/2020 | Fryman | ................... G16H 40/67 |
| 2003/0120948 | A1* | 6/2003 | Schmidt | .............. H04L 63/0815 |
| | | | | 726/8 |
| 2005/0005114 | A1* | 1/2005 | Medvinsky | ........... H04L 9/3213 |
| | | | | 713/168 |
| 2012/0066500 | A1* | 3/2012 | Ananthasu | ................ H04L 9/12 |
| | | | | 713/171 |
| 2013/0212420 | A1* | 8/2013 | Lawson | ................ G06F 9/5072 |
| | | | | 713/400 |
| 2014/0173688 | A1* | 6/2014 | Fischer | ................. H04L 9/3263 |
| | | | | 726/1 |
| 2014/0208390 | A1* | 7/2014 | Brown | .................. G06F 21/335 |
| | | | | 726/4 |
| 2016/0112406 | A1* | 4/2016 | Bugrov | ................. H04L 63/102 |
| | | | | 726/10 |
| 2018/0027071 | A1* | 1/2018 | Toepke | ............... H04L 67/1095 |
| | | | | 709/217 |
| 2018/0322274 | A1 | 11/2018 | Lutz et al. | |
| 2019/0245690 | A1* | 8/2019 | Shah | ..................... H04J 3/0667 |
| 2019/0319793 | A1* | 10/2019 | Schooler | ................ H04L 67/14 |

FOREIGN PATENT DOCUMENTS

| | | |
|---|---|---|
| CN | 107682139 | 2/2018 |
| EP | 3402152 | 11/2018 |
| WO | 2015049138 | 4/2015 |

OTHER PUBLICATIONS

David L. Mills et al., Internet Time Synchronization: The Network Time Protocol, Oct. 1991, IEEE, vol. 39, Issue: 10, pp. 1482-1493. (Year: 1991).*

Holger Zipper et al., Synchronization of Industrial Plant and Digital Twin, Oct. 17, 2019, IEEE, pp. 1678-1681. (Year: 2019).*

Jyotiranjan Swain et al., CMMSPEED: Reliable Real-time protocol for Industrial Mesh Network, Feb. 19, 2015, IEEE, pp. 1-4. (Year: 2015).*

Mills, D. et al. "Network Time Protocol Version 4: Protocol and Algorithms Specification", Internet Engineering Task Force (IETF) Standard, Internet Society (ISOC) 4, pp. 1-110 (pp. 16-23), Jun. 21, 2010.

PCT International Search Report and Written Opinion of International Searching Authority dated Jan. 20, 2021 corresponding to PCT International Application No. PCT/EP2020/081645 filed Nov. 10, 2020.

EP Search Report dated Apr. 20, 2020 based on EP19208307.9 filed Nov. 11, 2019.

* cited by examiner

METHOD AND SYSTEM FOR SECURE TIME SYNCHRONIZATION

CROSS-REFERENCE TO RELATED APPLICATIONS

This is a U.S. national stage of application No. PCT/EP2020/081645 filed 10 Nov. 2020. Priority is claimed on European Application No. 19208307.9 filed 11 Nov. 2019, the content of which is incorporated herein by reference in its entirety.

BACKGROUND OF THE INVENTION

1. Field of the Invention

The present invention relates to a system and method for secure time synchronization in an industrial plant.

2. Description of the Related Art

Process-engineering plants, such as refineries or factories (in which substances are altered with regard to composition, type or property, for example), as well as production-engineering plants (in which complex devices or cars are produced, for example), may have extremely complex structures. Industrial plants of this kind may, for example, be composed of a large number of components, which may possibly be networked with one another and/or dependent upon one another, such as actuators, and/or sensors.

In order to regulate the operation of these components, in particular to safeguard the (computer-assisted) communication between the components, (digital) certificates are usually used, which may be issued, distributed and checked within a corresponding engineering and/or runtime system. With the aid of keys assigned to the certificates, it is possible for sent messages to be encrypted and/or signed. Such a system may use what is known as a Public Key Infrastructure (PKI), for example. Without valid certificates, i.e., those issued by a certification authority, the components cannot be operated or can only be operated to a limited extent, i.e., cannot communicate with other components in a secure manner, for example.

In order to be able to operate a certificate management or such a system in a reliable manner, it is usually necessary to synchronize the system times of the various communication subscribers, since the checking of issued certificates is based on the system time, for example.

At the same time, this synchronization should be protected, in order to suppress or at least impede the (unnoticed) changing or manipulation of a system time of a communication subscriber by third parties. Otherwise, certificates that have already expired could also be used or misused by such a manipulation, for example. The security of the communication network would be compromised as a result.

Various standards are known for time synchronization purposes in this context, such as Network Time Protocol (NTP) or Precision Time Protocol (PDP). NTP uses the connectionless transport protocol UDP and can be deployed in packet-based communication networks. NTP was developed specifically in order to enable reliable time indication in networks with variable packet transit times. However, messages transmitted in accordance with the NTP standard are transferred without any integrity protection, whereby manipulations are possible.

This disadvantage of NTP is rectified by the standard Secure NTP (Secure Network Time Protocol), in which time stamps are transferred between the communication subscribers with a cryptographic hash function (MD5) in a secured manner. To this end, however, symmetrical keys are used, which have to be exchanged between the communication subscribers and securely stored in advance. A secure implementation of the exchange and the saving of these keys is highly elaborate in an industrial plant, in particular with a large number of plant components.

SUMMARY OF THE INVENTION

It is therefore an object of the present invention to improve the time synchronization in an industrial plant, in particular to make it simpler and/or more secure.

This and other objects and advantages are achieved in accordance with the invention by a system and a method for secure time synchronization in an industrial plant in accordance with a first aspect of the invention comprising: (i) transmitting a synchronization request of a plant component to a registration authority of a certificate management of the plant; (ii) checking the synchronization request, in particular for the authenticity thereof, via the registration authority; (iii) transmitting a synchronization response to the requesting plant component as a function of a result of the check; and (iv) adapting a system time of the plant component to a system time of the registration authority based on the synchronization response.

A registration authority (RA) of a certificate management of an industrial plant in the context of the invention is, in particular, a service that is configured to receive certification applications from plant components. Preferably, in this context the registration authority is configured to check an incoming certification application (for authenticity, such as based on a signature of the applying plant component) and, as a function of a result of the check, to forward it to a certification authority (CA), which issues a certificate to the applying plant component.

In particular, a plant component in the context of the invention is a physical component, or a component implemented as software, of the industrial plant. For example, a plant component may be a device or an application, which runs as software on a server of the plant, for example, where the server includes a processor and memory.

In particular, a time synchronization in the context of the invention is the calibration or adaptation of system times of various components, so that in the event of a time query relating to these components, for example, the same time stamp is generated or the same clock times are delivered. Time synchronization may in particular be a synchronization of (system) clocks of the plant components, where such a (system) clock may be an absolute or relative timer for ascertaining or outputting the system time, i.e., the clock time valid for the component in question, for example. In this sense, a synchronization of various system times may therefore also be the synchronization of various (system) clocks.

One aspect of the invention is based on the approach of using a certificate management system, such as a Public Key Infrastructure (PKI), for synchronization of system times of the plant components of an industrial plant. Certificates are usually managed in a safeguarded manner, i.e., messages are signed in accordance with a corresponding certificate management (communication) protocol with the aid of a key, for example. As a result, it is also possible for messages for time synchronization, such as synchronization requests and/or synchronization responses, to be safeguarded in this manner. In this context, it is possible to dispense with transmitting additional keys to the plant components solely for the purpose of time synchronization and/or storing them there, whereby it is possible to achieve a reduction of the outlay for implementation. Preferably, instead a standard for time synchronization such as NTP is integrated into the certificate management system, in particular into a corresponding certificate management protocol such as CMP. Therefore, it is possible to use the certificates and keys for time synchronization, which are used in any case for the purpose of certificate management.

Preferably, at least one message, with which the time synchronization is requested, is therefore transmitted from a plant component to a registration authority, which is part of the certificate management of the plant. In this context, this synchronization request may be transmitted in accordance with the certificate management protocol, i.e., in accordance with the communication protocol on the basis of which certificate requests are also transmitted from the plant components to the registration authority.

In this sense, it is conceivable in particular for a certificate management protocol to be modified or for a modified certificate management protocol to be used, where the modification enables the transmission of such messages for time synchronization.

The registration authority may then check the synchronization request, such as for authenticity, in a similar manner to a certificate request, in particular based on a signature of the applying plant component. If the result of the check is that the synchronization request is authentic, i.e., was not manipulated and/or was transmitted by a known or registered plant component for example, then the registration authority preferably sends a synchronization response to the requesting plant component, on the basis of which the system time of the plant component can be adapted to a system time of the registration authority.

In this context, both the synchronization request and the synchronization response may each contain one or more messages, which preferably are transmitted and/or are constructed in accordance with the certificate management protocol, i.e., comprise a signature of the sender, for example.

The synchronization request and/or response preferably in each case have at least one time stamp. Such a time stamp preferably indicates the system time of the requesting plant component or the registration authority, namely in particular at the time point of the sending of the synchronization request and/or response or of the messages contained therein. On the basis of the at least one time stamp of the synchronization response, it is then possible for the time synchronization to be performed.

In this context, it is conceivable for the synchronization request and/or response to have a plurality of various time stamps assigned to different time points. Thus, a further time stamp of the synchronization response may indicate, for example, the time point at which the synchronization request was received. From such time stamps, it is possible in particular to ascertain the transfer time (what is known as the latency) of the synchronization request and/or response and/or a time deviation (what is known as the offset) between the system time of the registration authority and the system time of the plant component and take these into consideration when adapting the system time of the plant component.

In one preferred embodiment, the synchronization request comprises a signature of the requesting plant component. The registration authority preferably reviews the synchronization request, in particular for authenticity, on the basis of this signature. With the aid of the signature, the registration authority is in particular able to review whether the synchronization request was actually transmitted by the requesting plant component and/or whether the synchronization request was manipulated as part of the transmission procedure. This enables a reliable safeguarding of the synchronization request, where at the same time the additional communication outlay is kept low.

In a further preferred embodiment, the requesting plant component generates the signature with the aid of a key from a Public Key Infrastructure. In this context, the key is preferably assigned to a certificate, for example, a manufacturer certificate or a customer-specific certificate issued during commissioning or an operational certificate issued during operation for a dedicated intended use, on the basis of which the authenticity of the key or the signature generated therewith can be reviewed. The time synchronization can thus be integrated into the certificate management in a particularly seamless manner.

In a further preferred embodiment, in the event of a synchronization request for the first time, a predefined number of request messages is transmitted and, in the event of a corresponding synchronization response, a corresponding number of response messages is transmitted. Preferably, the adaptation of the system time of the plant component to the system time of the registration authority is performed on the basis of the plurality of response messages. In this context, the response messages may also contain information relating to or from the request messages, such as time stamps contained in the request messages. With the aid of the predefined number of response messages (and possibly also request messages), it is possible to achieve a sufficiently precise time synchronization.

Thus, it is conceivable, for example, for time stamps contained in each response message to be used to ascertain an average transfer time (latency) and/or an average time deviation (offset) between the system time of the plant component and the system time of the registration authority. In the event of the synchronization of the system times for the first time, such as when commissioning the plant component, it is thus possible for the reliability to be increased, even if the communication channels of the industrial plant are under heavy load in this context.

In accordance with the certificate management protocol, which may possibly be modified, in this context in particular it may be provided or defined that, in the event of the plant component requesting a time synchronization for the first time, the predefined number of request messages is automatically transmitted to the registration authority. Preferably, it is accordingly defined that in each case a response message is transmitted to the requesting plant component in response to each of the request messages. Thus, it is possible for coordination between the system times in question to automatically take place a plurality of times for the synchronization (for the first time).

It has been shown through elaborate tests that a transmission of six request or response messages is advantageous with regard to the precision of the time synchronization (for the first time). Depending on the transfer duration and/or precision required during the synchronization, however, it is also possible to choose a different number of request or response messages.

In a further preferred embodiment, the synchronization for the first time is requested during commissioning of the plant component within the industrial plant, in particular as part of the application for a certificate. The time synchronization for the first time may be performed, for example, when a plant component is replaced or has been newly integrated into the plant and therefore requires new or updated certificates. As a result, it becomes possible to ensure that the system time of the plant component is synchronized with the system time of the registration authority when issuing certificates for the first time (and also further times as required).

In a further preferred embodiment, the request messages each comprise a signature of the requesting plant component. Preferably, the requesting plant component in this context generates the signatures with the aid of a private key assigned to a manufacturer device certificate or a customer device certificate. Such a manufacturer device certificate or customer device certificate is preferably already stored in the plant component as part of the production. As a result, the time synchronization for the first time can also be safeguarded, without an elaborate (secure) transmission of a corresponding key being necessary in advance.

As an alternative or in addition, it is also conceivable for the signatures to be generated with the aid of a key, which is assigned to another (equivalent) certificate comparable to the manufacturer device certificate or customer device certificate. For example, it is conceivable for a certificate issued by the plant operator/integrator/OEM to be used for this purpose.

In a further preferred embodiment, the predefined number of request messages is transmitted to the registration authority within a predefined period of time. In particular, it may be provided that predefined time intervals in each case lie between the transmitting of the plurality of request messages and the receiving of the corresponding response messages. As a result, it can be achieved that the system times of the plant component and the registration authority are already synchronized when issuing a certificate.

Preferably, the predefined period of time is chosen such that its length does not significantly impair, in particular delay, the use of the requesting plant component, in particular the commissioning thereof. For this purpose, the predefined period of time may, for example, amount to 1 second or less, preferably 500 ms or less, in particular 50 ms or less.

In a further preferred embodiment, in the event of a renewed synchronization request, precisely one response message is transmitted and, in the event of a corresponding synchronization response, precisely one response message is transmitted. Such a renewed synchronization may be requested, for example, by the plant component in a similar manner to a certificate or key renewal, in order to also be able to ensure the synchronicity of the system time of the plant component and the system time of the registration authority over longer periods of time. As the system time of the plant component is preferably only "reconstructed" in this context, transmitting a request or response message one time may be sufficient in order to maintain a precise synchronization.

In a further preferred embodiment, the request message comprises a signature, where the requesting plant component generates the signature with the aid of a key assigned to an operational certificate most recently issued. During operation of the plant or the plant component, this makes it possible to always use a current key and thus keep the safeguarding of the time synchronization up to date.

In a further preferred embodiment, the synchronization request is transmitted to the registration authority once more, before the plant component makes a certificate renewal application to a certification authority. For this purpose, the certificate management protocol, which may possibly be modified, may be configured to link the renewed transmission of the synchronization request with the making of a certificate renewal application, in particular to integrate it therein. In other words, in accordance with the certificate management protocol, which may possibly be modified, it may be provided to automatically transmit the synchronization request once more, when there is an application for a new certificate. As a result, it can be ensured that the system time of the plant component is synchronized with the system time of the registration authority when renewing a certificate.

Alternatively, however, the synchronization request may also be made once more independently of a certificate (renewal) application. In particular, it is conceivable for synchronization requests to be transmitted (regularly) at predefined time intervals, such as to enable or maintain a permanent synchronicity of the system times. Preferably, these renewed synchronization requests are also transmitted based on the certificate management protocol, which may possibly be modified, and can be checked, for example, for authenticity, by the registration authority. In this context, the renewed synchronization requests are also protected from manipulation.

In a further preferred embodiment, it is first checked whether the system time of the registration authority and the system time of the plant component are synchronized, where the system time of the plant component is adapted to the system time of the registration authority as a function of a result of the check. In particular, it is possible to check whether or to what extent the system time of the plant component and the system time of the registration authority deviate from one another. The extents of the deviation of the system times ascertained during such a check may be taken into consideration during an adaptation that then follows.

In order to reduce the amount of communication in the plant, the check relating to the deviation may be based on the synchronization request or response. As an alternative, however, it is also conceivable to transmit a separate check request from the plant component to the registration authority and, in response, to transmit a corresponding separate check response from the registration authority to the plant component, and to perform the check on the basis of the check response or the information contained therein, possibly also relating to the check request. As a function of a result of the check, it is then possible for the synchronization request to be transmitted, particularly if there is a deviation—which may possibly exceed the deviation threshold value.

In a further preferred embodiment, the synchronization request and the synchronization response are transmitted at least essentially in accordance with the certificate management protocol CMP. CMP (Certificate Management Protocol) enables flexible and reliable certificate management and can therefore advantageously be deployed in industrial plants. Preferably, in this context CMP is supplemented with at least one message type for the purpose of time synchronization.

As an alternative, however, it is also conceivable to use another certificate management protocol to transmit the synchronization request or response. For example, the certificate management protocol CMC (Certificate Management over CMS) could also be used.

A system for secure time synchronization in an industrial plant in accordance with a second aspect of the invention has a registration authority for certificate management, which is configured to check a certificate application of a plant component. In accordance with the invention, the registration authority is furthermore configured to receive a synchronization request from the plant component and to check it, in particular for the authenticity thereof, and to transmit a synchronization response to the requesting plant component as a function of a result of the check, on the basis of which synchronization response a system time of the plant component can be adapted to a system time of the registration authority.

The description presented thus far of preferred embodiments of the invention contains numerous features which are repeated in the individual dependent claims, with several combined into groups in some cases. However, these features can also be considered individually and combined to form sensible further combinations. In particular, these features can be combined individually in each case and in any suitable combination with the system in accordance with the first aspect of the invention and the method in accordance with the second aspect of the invention.

The above-described characteristics, features and advantages of the invention, as well as the manner in which these are achieved, are explained in more detail in conjunction with the figures in connection with the following description of exemplary embodiments of the invention. In the figures, the same reference characters are used consistently for the same elements of the invention, or elements which correspond to one another. The exemplary embodiments serve to explain the invention and do not restrict the invention to the combinations of features contained therein, including in relation to functional features. In addition, for this purpose, suitable features of the exemplary embodiments may also be considered explicitly in isolation and combined with any one of the claims.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings, at least in a partially schematic manner.

DETAILED DESCRIPTION OF THE EXEMPLARY EMBODIMENTS

Figure 1:
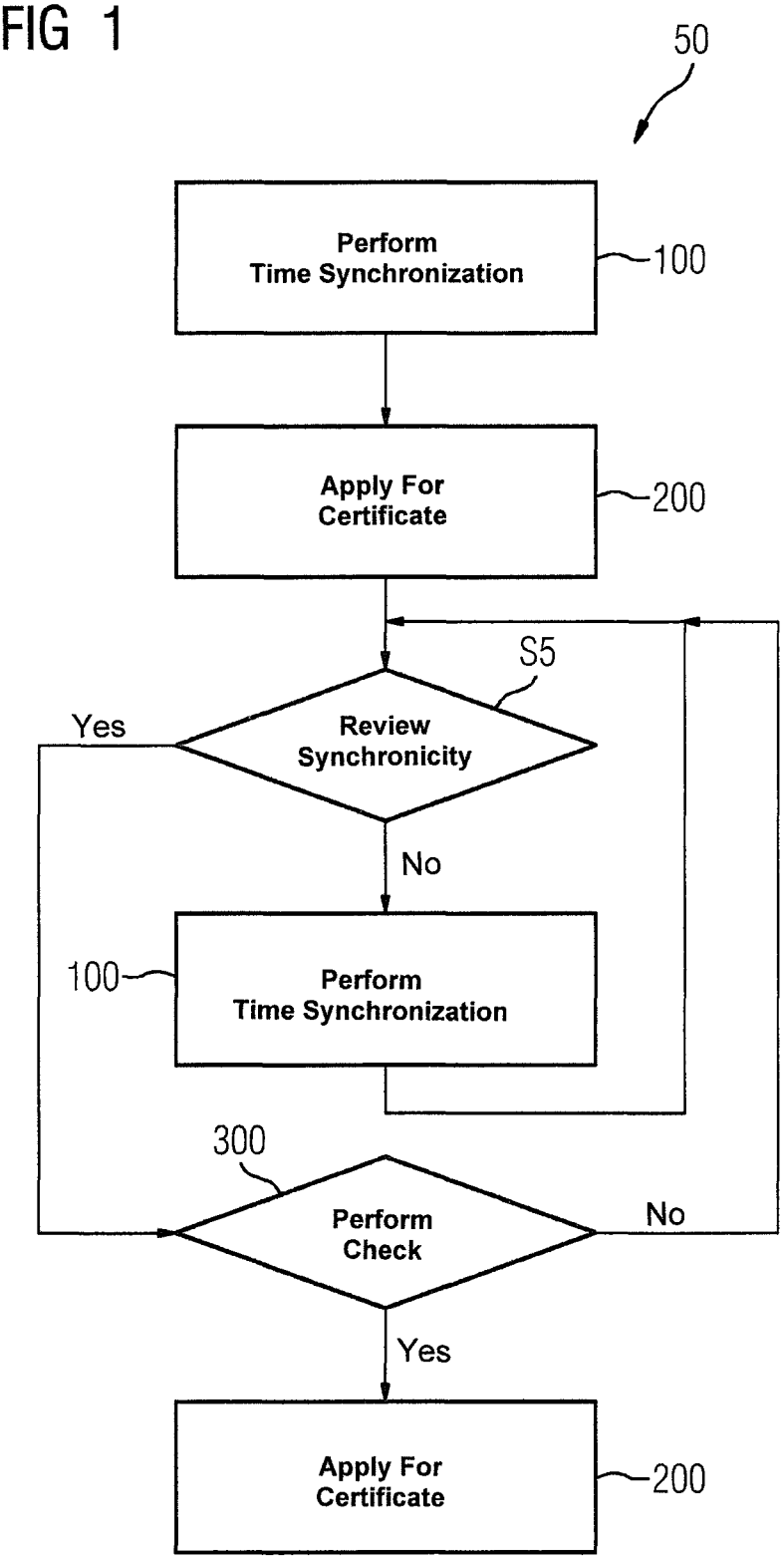
FIG. 1 shows an exemplary flowchart of a method for certificate management, which comprises a method for time synchronization in accordance with the invention.

FIG. 1 shows an example of a method 50 for certificate management in an industrial plant. In this context, the method 50 also comprises at least one, in the present example two, methods 100 for time synchronization in the industrial plant.

In this context, the method 100 is first designed for time synchronization. Here, the system times of a registration authority of the certificate management, which is configured, for example, for checking certificate applications, and of a plant component are synchronized for the first time, in order to make it possible for the plant component to apply for a certificate for the first time in method step 200. Such an application for a certificate for the first time corresponds to an initialization of the plant component, for example, once it has been newly integrated into the plant, and is also referred to as bootstrapping.

In this context, the method 100 for time synchronization comprises (i) transmitting a synchronization request from the plant component to the registration authority, (ii) checking the synchronization request by way of the registration authority, (iii) transmitting a synchronization response to the requesting plant component as a function of a result of the check, as well as (iv) adapting the system time of the plant component to the system time of the registration authority based on the synchronization response. The details of this method 100 are explained in conjunction with FIG. 2.

Once the system times have been synchronized in this manner, the certificate can be applied for in method step 200. Here, the method step 200 may comprise a plurality of substeps, such as (i) transmitting a certificate application to the registration authority, (ii) checking the certificate application via the registration authority and (iii) issuing a certificate for the applying plant component via a certification authority of the certificate management as a function of a result of the check. The procedure of the substeps of the method step 200, i.e., the bootstrapping, may therefore correspond in its essentials to the procedure of the method 100 for time synchronization.

During operation of the industrial plant, a renewal of the certificate issued in method step 200 or of a key assigned to it may be provided or become necessary, such as to prevent or at least impede a misuse of certificates or keys. Also, in this context, should there be synchronicity of the system times of registration authority and plant component. Therefore, in a method step S5, following the application for a certificate (for the first time), the synchronicity of the system times can be reviewed.

For this purpose, the plant component preferably transmits a check request to the registration authority, to which the registration authority replies with a check response. The check response may, for example, contain a time stamp of the system time of the registration authority, which indicates the time point at which the check response was sent to the plant component. If the transmission duration of the check response is known, then the synchronicity can be reviewed on the basis of the check response.

In this context, the transmission duration may possibly be ascertained by taking into consideration further time stamps. For example, it is possible to relate the sending time points of the check request and check response to the receiving time points of the check request and check response and to average the two transmission durations resulting therefrom, in order to obtain an (average) transmission duration that is independent of the synchronicity of the two system times.

If the time deviation between the two system times exceeds a predefined deviation threshold value, then the method 100 for time synchronization is performed once more and the synchronicity is possibly checked once more.

In this context, it is conceivable to perform the method step S5 at regular, predefined time intervals, in particular regardless of whether a certificate renewal is to be subsequently performed. Therefore, as shown in the present example, it may be provided, after assessing the synchronicity of the system times of the registration authority of the plant component, to check whether there is an impending certificate or key renewal. This check is performed in method step 300. As a function of a result of the check, particularly if such a renewal is necessary, the method step 200 for applying for a certificate can be performed once more. Otherwise, particularly after the predefined time interval, method step S5 can be re-performed.

As an alternative to the procedure shown in FIG. 1, it is also possible to check the synchronicity of the system times of the registration authority and the plant component as part of the method 100 for time synchronization and to only adapt the system time of the plant component to the system time of the registration authority if the two system times deviate from one another to too great an extent, i.e., the time deviation between the system times reaches or exceeds the deviation threshold value, for example.

Likewise, it is also conceivable to perform the method 100 for time synchronization as standard before the renewal of a certificate or key.

Figure 2:
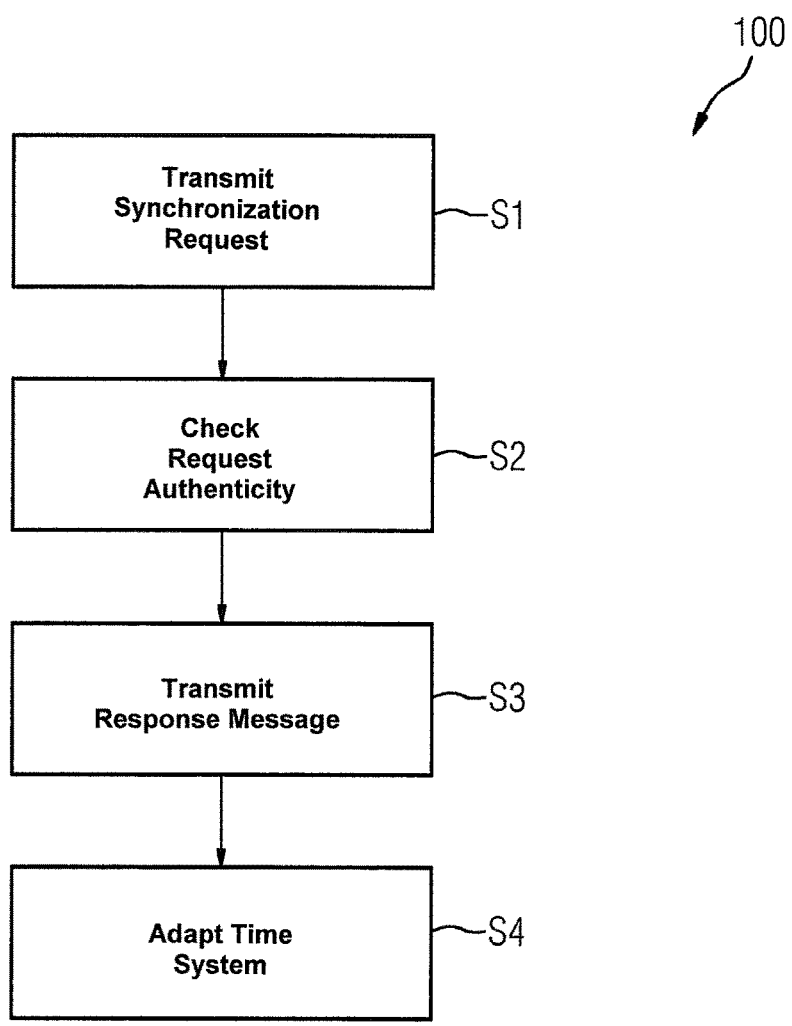
FIG. 2 shows an exemplary flowchart of a method for time synchronization in accordance with the invention.

FIG. 2 shows an example of a method 100 for time synchronization in an industrial plant.

In a method step S1, a synchronization request is transmitted from a plant component to a registration authority of a certificate management. In this context, this synchronization request is preferably defined via a certificate management protocol, for example CMP, in accordance with which certificate applications are also transmitted.

The transmission of the synchronization request in this context preferably comprises the successive sending of a predefined number of request messages, such as six request messages. In this context, each of these request messages may contain a signature of the requesting plant component, where the signatures of the plant component are generated, for example, with the aid of a key, which is assigned to a manufacturer certificate of the plant component.

As a result, the request messages can be checked for the authenticity thereof by the registration authority in method step S2. Here, the registration service can ascertain, for example, whether one or more of the request messages was manipulated during the transmission. In this case, the synchronization request is discarded or is not acknowledged.

If the authenticity of the request messages becomes apparent as part of the check, however, then the registration authority in method step S3 transmits a corresponding response message to the requesting plant component for each of the request messages (transmitted in succession). In this context, the response messages may be understood as synchronization response.

Both the request messages and the response messages may contain time stamps of the system time of the plant component and/or the registration authority. In this context, at least some of these time stamps preferably indicate a sending time point, at which the messages were sent. Others of these time stamps, however, may indicate a receiving time point, at which the messages were received. From the time stamps contained in a request message as well as the time stamps contained in a subsequent response message, it is therefore possible to derive an (average) transmission duration (delay) of the messages as well as a time deviation (offset) between the system times of the registration authority and the plant component.

As a result of a plurality of these messages preferably being transmitted (in succession), the transmission durations derived in each case as well as the time deviations derived in each case can be averaged over the number of messages transmitted (in pairs). On the basis thereof, in a method step S4, the system time of the plant component can be adapted to the system time of the registration authority.

Figure 3:
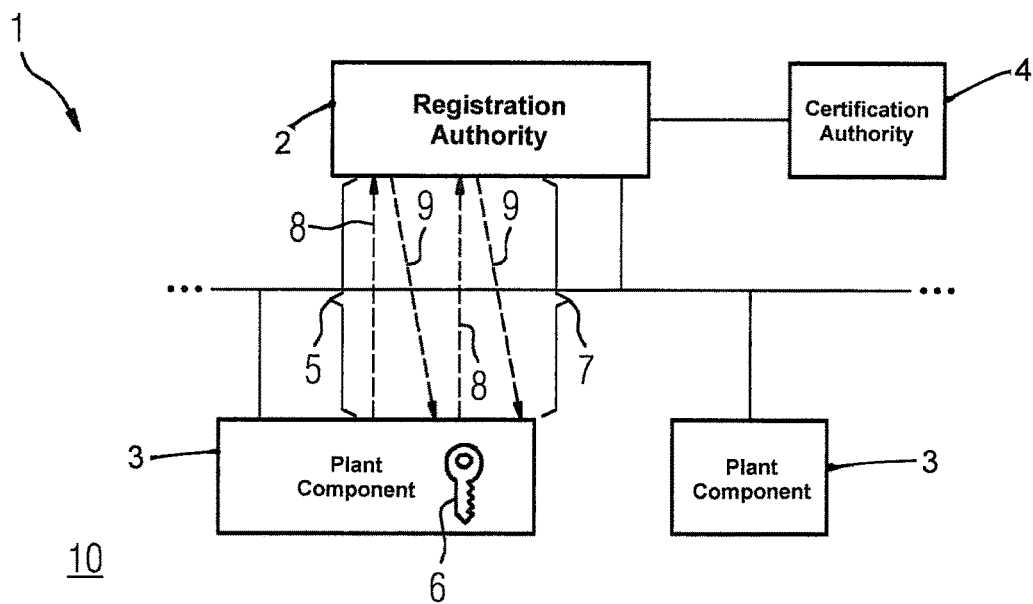
FIG. 3 shows an exemplary schematic block diagram of a system for time synchronization in accordance with the invention.

FIG. 3 shows an example of a system 1 for time synchronization in an industrial plant 10. The system 1 has a registration authority 2, which preferably is part of a certificate management. The registration authority 2 may be configured, for example, to check a certificate application of one of a plurality of plant components 3, for example for authenticity, and to forward it to a certification authority 4 as a function of a result of checking. The certification authority 4 may then issue the applying plant component 3 with a corresponding certificate, on the basis of which the communication with other plant components 3 is possible. The system may also include a server including a processor and memory (not shown).

The registration authority 2 is preferably moreover also configured to receive a synchronization request 5 for time synchronization from a plant component 3 and to check it, at least essentially in a similar manner to a certificate application. For this purpose, the synchronization request 5 may contain a signature of the requesting plant component 3 which, for example, is based on a key 6 stored in the plant component 3, such as in a memory of the plant component 3. Accordingly, the registration authority 2 may be configured to decide on the authenticity of the synchronization request 5 on the basis of the signature.

If the registration authority 2 ascertains that the synchronization request 5 is authentic or reliable, then the registration authority 2 preferably sends a synchronization response 7 to the plant component 3, on the basis of which the plant component 3 can adapt its system time to a system time of the registration authority 2. For this purpose, the synchronization response 7 may, for example, contain information relating to the time points at which the synchronization request 5 was sent and/or received and the synchronization response 7 was sent, such as in the form of time stamps of the system times of the plant component 3 or the registration authority 2.

In order to increase the precision of the time synchronization, this synchronization request 5 preferably comprises a predefined number of request messages 8, in response to which the registration authority 2 sends a corresponding response message 9 in each case. The response messages 9 are comprised by the synchronization response 7.

The synchronization request 5 and response 7 each comprise, as shown purely by way of example in FIG. 3, two request or response messages 8, 9, which are shown as dashed arrows. In this context, the messages 8, 9 are preferably transmitted in succession or in sequence, in particular within a predefined duration. By taking into consideration a plurality of response messages 9 or the information contained therein relating to a transmission duration (delay) of the messages 8, 9 and/or the time deviation (offset) between the system times of the registration service 2 and the plant component 3, it is possible, such as based on an averaging, to compensate for or at least reduce the effects of temporally limited impairments or a bandwidth limiting of the communication network of the plant 10 on the time synchronization. In this context, it has been shown that the six request and response messages 8, 9 are each advantageous with respect to duration and precision of the synchronization method.

Figure 4:
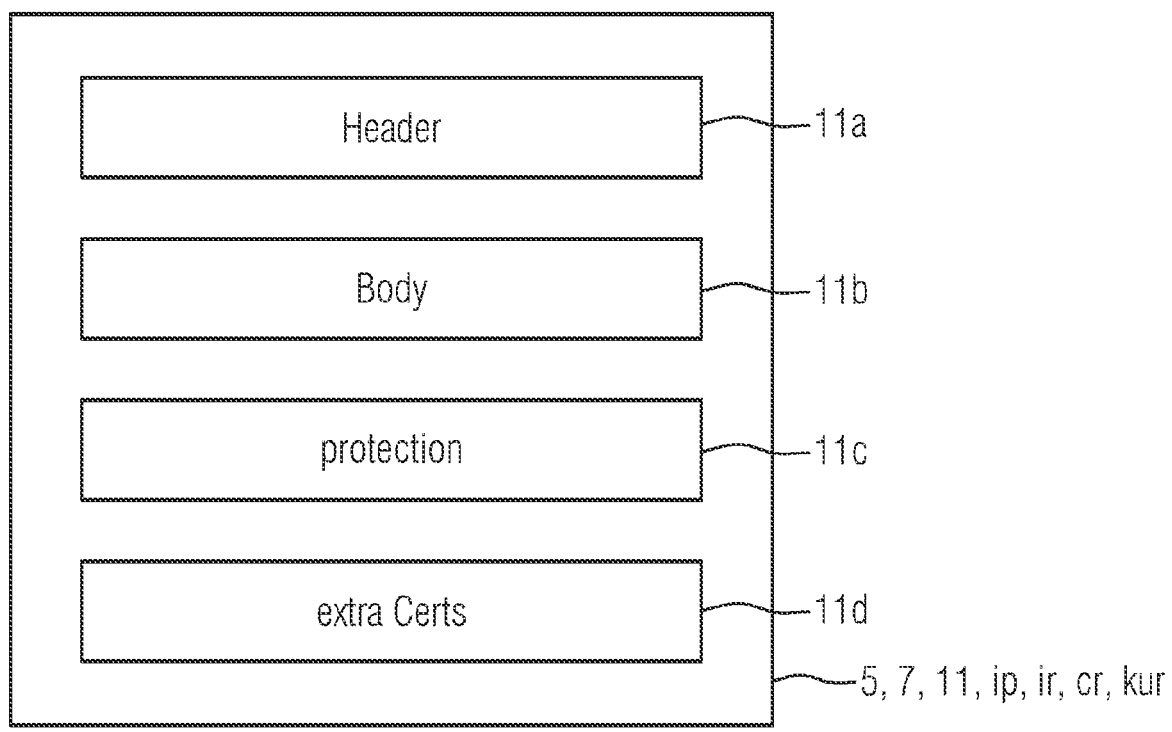
FIG. 4 shows an exemplary message in accordance with the certificate management protocol CMP.

FIG. 4 shows an example of a message 11, which is constructed in accordance with the certificate management protocol CMP. Various message types can be defined on the basis of this structure. Such messages 11 are sent, for example, as a certificate application from plant components to a registration authority. Advantageously, however, such messages 11 can also be transmitted, for example, as a synchronization request 5 or synchronization response 7 between a plant component and the registration authority, in order to adapt a system time of the plant component to a system time of the registration authority. In this context, synchronization request 5 and synchronization response 7 each form a (newly) defined message type. A certificate management protocol based on CMP, in which these two message types are defined, is for this reason also referred to as modified CMP.

A CMP message 11 has four different fields as standard, which are referred to as "header 11*a*", "body 11*b*", "protection 11*c*" and "extra Certs 11*d*".

In accordance with the CMP standard RFC 4210, following transmission of a certificate application, a plant component obtains a response ("initialization response", ip) from the registration authority (or a certification authority associated with the registration authority). This may involve various types of certificate applications, such as an initial certificate application, which is also referred to as "initialization request" (ir). Another certificate application is made, for example, for certificate renewal with the use of the same key ("certification request", cr) or for certificate renewal with key renewal ("key request", kur).

The messages for certificate application ir, cr, kur and response ip differ in this context in the field body 11*b*, in order to be able to transmit the information in question in each case. The field body 11*b* of a synchronization request 5 and response 7 is preferably formed essentially as the field body 11*b* of the certificate application ir, cr, kur or the response ip, but contains additional information which enables a time synchronization.

The field body 11*b* of a synchronization request 5 may, for example, (additionally) contain a time stamp of the system time of the requesting plant component, which indicates the sending time point of the request 5. In particular, information relating to a predefined number of request messages to be transmitted may also be contained (cf. FIG. 3). Preferably, at least part of the field body 11*b* of the synchronization request 5 is defined in accordance with the synchronization standard NTP (RFC 1129).

The field body 11*b* of a synchronization response 7, however, may, for example, (additionally) contain time stamps of the system time of the requesting plant component as well as of the registration authority, which indicate the sending time point and the receiving time point of the synchronization request 5 as well as the sending time point of the response 7. In particular, information relating to a predefined number of response messages to be transmitted may also be contained (cf. FIG. 3). In this context, at least part of the field body 11*b* of the synchronization response 7 is also preferably defined in accordance with the synchronization standard NTP (RFC 1129).

The field protection 11*c* usually contains information relating to a signature, with which the message is to be signed. In order to safeguard the communication between plant component and registration authority during the time synchronization, this information or a signature of the synchronization request 5 and response 7 is preferably mandatory.

The content of the fields header 11*a* and extra Certs 11*d* is usually the same for the various message types.

Thus, while there have been shown, described and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for secure time synchronization in an industrial plant, the method comprising:
    transmitting a synchronization request of a plant component to a registration authority of a certificate management of the plant, the synchronization request comprising a signature of the requesting plant component;
    checking the synchronization request via the registration authority;
    transmitting a synchronization response to the requesting plant component as a function of a result of the check; and
    adapting a system time of the plant component to a system time of the registration authority based on the synchronization response;
    wherein the synchronization request is re-transmitted to the registration authority, before the plant component completes a certificate renewal application to a certification authority;
    wherein a check is initially performed to determine whether the system time of the registration authority and the system time of the plant component are synchronized; and
    wherein the system time of the plant component is adapted to the system time of the registration authority as a function of a result of the check.

2. The method as claimed in claim 1, wherein the requesting plant component generates the signature aided by a key from a Public Key Infrastructure.

3. The method as claimed in claim 1, wherein in an event of a first time a synchronization request occurs, a predefined number of request messages is transmitted and, in an event of a corresponding synchronization response, a corresponding number of response messages is transmitted.

4. The method as claimed in claim 3, wherein the synchronization for the first time is requested during commissioning of the plant component within the industrial plant.

5. The method as claimed in claim 4, wherein the request messages each comprise a signature of the requesting plant component; and wherein the requesting plant component generates signatures aided by a key assigned to a manufacturer device certificate or a customer device certificate.

6. The method as claimed in claim 4, wherein a predefined number of request messages is transmitted to the registration authority within a predefined period of time.

7. The method as claimed in claim 3, wherein the request messages each comprise a signature of the requesting plant component; and wherein the requesting plant component generates signatures aided by a key assigned to a manufacturer device certificate or a customer device certificate.

8. The method as claimed in claim 7, wherein a predefined number of request messages is transmitted to the registration authority within a predefined period of time.

9. The method as claimed in claim 3, wherein a predefined number of request messages is transmitted to the registration authority within a predefined period of time.

10. The method as claimed in claim 1, wherein in an event of a renewed synchronization request, precisely one response message is transmitted and, in an event of a corresponding synchronization response, precisely one response message is transmitted.

11. The method as claimed in claim 10, wherein the request message comprises a signature; and wherein the requesting plant component generates the signature aided by a private key assigned to a most recently issued operational certificate.

12. The method as claimed in claim 1, wherein the synchronization request and the synchronization response are transmitted in accordance with certificate management protocol.

13. A system for secure time synchronization in an industrial plant, comprising:
- a server including a processor and memory; and
- a registration authority for certificate management, said registration authority being configured to check a certificate application (ir, cr, kur) of a plant component;

wherein the registration authority is furthermore configured to receive a synchronization request from the plant component, the synchronization request comprising a signature of the requesting plant component, and furthermore configured to check said synchronization request, and furthermore configured to transmit a synchronization response to the requesting plant component as a function of a result of the check, a system time of the plant component being adaptable to a system time of the registration authority based on said synchronization response;

wherein the synchronization request is re-transmitted to the registration authority, before the plant component completes a certificate renewal application to a certification authority;

wherein a check is initially performed to determine whether the system time of the registration authority and the system time of the plant component are synchronized; and wherein the system time of the plant component is adapted to the system time of the registration authority as a function of a result of the check.

* * * * *